United States Patent [19]

Müller et al.

[11] Patent Number: 4,729,569
[45] Date of Patent: Mar. 8, 1988

[54] TWIST PROOF SEAL RING ARRANGEMENT FOR SHAFTS

[75] Inventors: Heinz K. Müller, Waiblingen; Andreas Wolf, Stuttgart, both of Fed. Rep. of Germany

[73] Assignee: Martin Merkel GmbH & Co KG, Hamburg, Fed. Rep. of Germany

[21] Appl. No.: 754,516

[22] Filed: Jul. 11, 1985

[30] Foreign Application Priority Data

Jul. 11, 1984 [DE] Fed. Rep. of Germany ....... 3425431
Jan. 29, 1985 [DE] Fed. Rep. of Germany ....... 3502799

[51] Int. Cl.[4] .............................................. F16J 15/26
[52] U.S. Cl. ..................................... 277/27; 277/104; 277/166; 277/203
[58] Field of Search ................. 277/27, 134, 165, 166, 277/102, 181, 186, 116.2, 188 R, 188 A, 189, 203, 104, 113

[56] References Cited

U.S. PATENT DOCUMENTS

| 1,307,901 | 6/1919 | Farland et al. | 277/203 X |
| 1,770,509 | 7/1930 | Chambers | 277/203 X |
| 1,811,588 | 6/1931 | Moreau | 277/134 |
| 4,175,475 | 11/1979 | Eckhardt | 277/203 X |
| 4,336,945 | 6/1982 | Christiansen et al. | |

FOREIGN PATENT DOCUMENTS

| 0134068 | 3/1985 | European Pat. Off. | 277/27 |
| 0170928 | 2/1986 | European Pat. Off. | 277/27 |
| 903878 | 2/1954 | Fed. Rep. of Germany . | |
| 3207327 | 9/1983 | Fed. Rep. of Germany . | |
| 3425431 | 12/1985 | Fed. Rep. of Germany | 277/27 |
| 27569 | 12/1902 | Switzerland | 277/134 |
| 559736 | 3/1944 | United Kingdom | 277/203 |
| 762958 | 12/1956 | United Kingdom . | |
| 933133 | 8/1963 | United Kingdom . | |
| 982219 | 2/1965 | United Kingdom . | |
| 2061415 | 5/1981 | United Kingdom . | |

OTHER PUBLICATIONS

"The Heat Load of an Oil Seal", R. V. Brink, BHRA Fluid Engineering, Cranfield, Bedford, Engld., pp. C1-1 thru C1-10, 1973.
"Dichtungselemente", Prof. Dipl.In.A.Leyer, pp. 939-944, Maschinenkonstrukslehre, Nr. 24/1965.
"Slanted O-Rings Extend Shaft Life", Leonard J. Martini, Mechanical Engineer Naval Ocean Systems Center, San Diego, Calif., pp. 77 and 78, no date.

Primary Examiner—Robert S. Ward, Jr.
Attorney, Agent, or Firm—Michael J. Striker

[57] ABSTRACT

Means for preventing relative twisting between a seal ring and the parts of structure accommodating it by providing that in connection with high pressure shaft seals, the axial thrust resulting from the action of the pressure of the seal ring on its low pressure side radial face is taken up by a number of projections, the cross section of the seal ring undergoing undulating deformation as seen in the circumferential direction owing to the axial flexure of individual parts of the seal ring; it is furthermore possible to have additional projections as means for preventing twisting. As a consequence of the undulation of the entire cross section of the seal ring there will also be the useful effect of undulation of the seal interface edge, constituted by parts of this cross section, on the high pressure side.

10 Claims, 16 Drawing Figures

Fig. 2c
(section A-B)

TWIST PROOF SEAL RING ARRANGEMENT FOR SHAFTS

BACKGROUND OF THE INVENTION

The functional efficiency of shaft seals is frequently impaired by frictional heat evolved at the sealing faces. More especially in the case of seals with a pressure dependent seal surface contact force, there will be a comparatively high frictional power loss at high pressures. If, furthermore, seals are made of materials with a low thermal conductivity there will then be a danger of the maximum allowable temperature for the material being exceeded at the sealing faces so that the seal will prematurely fail.

One expedient used in seal technology for reducing friction losses is the production of an appropriate lubricant film between the sliding seal surfaces to separate them and fill up the seal gap. Such a liquid acting as a lubricant and to be sealed off by the seal may substantially decrease the coefficient of friction. Simultaneously recourse may be had to dynamic film formation also to decrease wear of the sliding seal faces or practically reduce it to zero.

In the case of axially moving piston and rod seals there will be a formation of lubricant film in all cases because of the nature of the system, that is to say, because the parts are wetted periodically by the liquid to be sealed off, and sliding seal parts so move that liquid is entrained into the seal gap.

In the case of sealing shafts a lubricant film is not able to be produced in this way as long as seal interface edge next to the liquid to be sealed is in a plane normal to the axis of rotation of the shaft with the seal: in this case there is no component of motion capable of entraining liquid into the seal gap.

In the case of certain specific types of low-pressure shaft seals, more especially customized radial shaft seals (see Brink, R. V. "The Heat Load of an Oil Seal", paper C1, 6th International Conference on Fluid sealing, 1973, Munich) this problem has been tackled by making the seal edge undulated in the circumferential direction so that it will be possible to produce a component of motion partly directed towards the edge of the seal interface and a consequent hydrodynamic formation of the desired lubricant film. However, such a design was not available for forms of seal ring suitable for use with high pressure differences, as for example o-rings, x-rings or elastomer seals with a rectangular cross section.

Although a proposal has been made in connection with o-rings for example to arrange the seal ring plane obliquely in relation to the shaft axis by having a suitably formed groove in the housing for the o-ring (Leyer, A, "Maschinenkonstruktionslehre", Technica, No. 10, 1960, page 941 ff. and Martini, L, J, : "Slanted o-Rings extend Shaft Life", Machine Design, Feb 8, 1979), such a design did not prove to be practically acceptable, be it because of the complex form and therefore expensive manufacture of the groove or be it because of the unfavorable, asymmetrical direction of the forces and of the flow of heat generated by friction.

For use with hydraulic pressures acting on axially moving machine elements reinforced edge seal packings of reinforced PTFE are frequently used. It might therefore seem obvious to apply the principle, evolved in connection with radial shaft seals, of the axially undulating seal edge to such rings by producing them with an undulating seal edge. Since however as a general rule such PTFE edged seal packings have to be machined, the production of undulating contours would turn out to be an involved and expensive manufacturing operation. In addition there would be an undesired asymmetry of the portions, capable of causing reverse flow, of the dynamic seal faces.

A still further problem in connection with high pressure shaft seals is the risk of the sealing ring, as for example an o-ring or a PTFE edged seal packing, seizing on the cooperating face and then being entrained by the shaft in rotation. Generally this will lead to a premature failure of the seal, inasmuch as the surfaces then making sliding contact with each other will not provide a suitable sliding and sealing function because of unsuitability of the combination of materials or of their surface finishes.

SUMMARY OF THE PRESENT INVENTION

One object of the invention is to solve this problem.

More specifically, a further object of the invention may be defined as creating means for preventing relative twisting between the seal ring and the parts of structure accommodating it in the simplest and most economic manner.

For remedying the shortcomings mentioned and for attaining the said object in connection with high pressure shaft seals, the axial thrust resulting from the action of the pressure of the seal ring on its low pressure side radial face is taken up by a number of projections, the cross section of the seal ring undergoing undulating deformation as seen in the circumferential direction owing to the axial flexure of individual parts of the seal ring; it is furthermore possible to have additional projections as means for preventing twisting.

As a consequence of the undulation of the entire cross section of the seal ring there will also be the useful effect of undulation of the seal interface edge, constituted by parts of this cross section, on the high pressure side.

Preferably the projections are formed on a special backup ring. In the case of PTFE edged seal packings or other seal rings of resin the projections may also be present on the radial side, facing away from the pressure, of the seal ring or packing.

In the case of the application of elastomer seal rings the principle of the present invention may be preferably translated into practice by having a backup ring on the low pressure side which has projections forming undulations on its side facing the seal ring. In this case the steepness of the undulations as seen in the circumferential direction may be different on the rising and falling sides of the undulations, this offering the designer a chance of controlling the mechanism of fluid drag, and consequently of the formation of lubricant film in a way dependent on pressure of the fluid to be sealed off. More especially for the sealing off of liquids standing under a high pressure it may be advantageous to make the component of drag velocity from the space to be sealed into the seal gap smaller than the component dragging the liquid from the gap back into the higher pressure space. Owing to the asymmetry of the force in the seal gap the optimum dynamic sealing effect is produced in this case.

In accordance with the invention it is also possible for the projections of the backup ring to be made prismatic as well so that the seal ring only engages the edges or the front sides of the prisms when pressure is low and only engages further parts of the radial face of the backup ring when the pressure rises. This arrangement is particularly advantageous because here the undulation of the edge of the seal interface is continuously increased in a way dependent on pressure and therefore there is the desired effect of an increase in the hydrodynamic lubricating effect with an increase in pressure. Furthermore there is a relatively pronounced local deformation of the seal ring at the edges of the prisms engaged by the seal ring with a high local contact pressure. Therefore the seal ring is interlockingly anchored at the edges of the prismatic projections so that there is then the desired keying between the seal ring and the backup ring to prevent relative twisting therebetween, this being more especially of value if the seal ring is a resin ring having a greater flexural rigidity than an elastomer ring.

If comparatively stiff seal rings of resin are employed then elastomer clamping rings will be used additionally in a known manner which preload the seal ring to amplify the sealing effect while at the same time providing an ancillary sealing effect. In such arrangements the backup ring having the projections is preferably so contrived that the clamping ring, that is radially offset in relation to the seal ring, also engages the projections of the backup ring, that is to say, the projections extend radially over the radial face of the support ring.

If in accordance with the invention the two opposite radial faces of the backup ring are fashioned with projections, further substantial advantages of the seal arrangement will result. If in such an arrangement the seal ring has sagged so far between the projections that it engages the plain part, between the projections of the backup ring, then on a further increase in pressure the plain part of the ring, only partly supported on the other side, will also be bent axially. Therefore the designer is now fully in a position to provide a degree of undulation, ranging up to the highest pressure to be encountered, of the seal interface edge on the high pressure side by suitably coordinating the flexural stiffness both of the seal ring and of the backup ring. A further useful effect of the projections additionally arranged on the low pressure side of the backup ring is to be seen in that they may function as abutments precluding twisting of the backup ring. Preferably the wall of the housing or a radial face of the shaft, which is engaged by the backup ring under the effect of pressure, has projections, pins or the like arranged in it, which fit into the gaps between the projections on the non-pressure side of the backup ring. Lastly, the arrangement of similar projections on the backup ring in accordance with the invention involves the further advantage that it is not possible for the backup ring to be put in place the wrong way round by accident.

A particularly advantageous seal arrangement is made possible in accordance with the invention if the seal ring employed is in the form of an annular disk like a belleville washer that engages the conical end face of the backup ring bearing the projections. Preferably in this case also the sealing effect on the moving machine element is produced in a known manner by pressing an edge of the seal ring against the matching sliding seal surface.

Backup rings bearing projections on one or both sides may, in accordance with the invention, readily be used with hydraulic edged seal packings adapted inherently for axial motion as seals on rotating shafts.

A form of the backup rings bearing projections in accordance with the invention, that is particularly advantageous from the economic point of view, is one in which the rings are produced from continuous strips so that in this case as well seal arrangements for any diameter of shaft may be produced using one and the same "backup strip", which is cut to the desired length before assembly, bent into the form of ring leaving a joint gap and then placed in its annular groove.

Finally, the undulated form, which becomes more pronounced with a rise in pressure in accordance with the invention, of the high pressure edge of the seal interface in the case of seal rings of resin may also be ensured by arranging the projections on the non-pressure radial face of the seal ring. Preferably in this case the seal ring will be supported on a flat wall, the projections however being able to assume the ancillary function of preventing twisting.

A construction of a seal arrangement that is optimum from the technical aspect, embodying the features of the invention, may be produced if, using a special geometry of the clamping ring in relation to the seal edge of the seal ring, on the one hand just the sufficient seal edge pressure is produced and on the other hand, owing to a partly sagging seal ring cross section, on the high pressure side an axially undulating seal interface edge is produced. This is made possible in accordance with the invention if the plane, in which the seal ring engages the projections, is displaced axially opposite the nonpressure abutment surface of the clamping ring towards the low pressure edge and at the same time, as has been proposed (see the German patent application 3,207,327) the seal edge of the seal ring is placed in the direct vicinity of the non-pressure radial face of the seal ring. The combination of the inherently known relief of the seal edge from the pressure of the fluid with the pressure dependent lubricating effect increasing with pressure in accordance with the invention owing to the undulating deformation of the high pressure seal interface edge results, all in all in an extended working life of the seal which is not otherwise obtainable. At the same time this seal arrangement reduces the static friction to be overcome on incipient motion and also dynamic friction to be overcome during normal running to a minimum. This makes it possible to avoid undesired stick-slip phenomena on the one hand while on the other hand the friction power loss remains low over the entire operational range of the seal.

In the case of certain practical cases of application a shaft seal has to meet additional requirements, something that is made possible by the adoption of further features of the present invention.

One particular operational requirement is for the seal ring to be able to be freely moved in a radial direction, if irregularities of the shaft surface, eccentricity or shaft sag or the like make it necessary for the seal to continuously follow the rapid radial displacement of the shaft surface. The direct radial mobility of the seal ring in its accommodating groove is impeded by the friction occurring between the seal ring and the projections, in accordance with the invention, acting as abutment faces.

This shortcoming is remedied in accordance with the invention inasmuch as the seal ring is housed in a sleeve which is free to move in relation to the housing by virtue of the presence of radial play. In this respect the play is made at least so large that the radial motion of the shaft transmitted by the seal ring onto the sleeve may take place without radial contact between the sleeve and the housing. A seal is produced between the sleeve and the housing by a further seal ring that also provides axial support.

When in arrangements in accordance with the invention the fluid pressure on the seal is high, the part of the seal ring between the seal face and the backup ring may be so far deformed by the radially directed contact pressure of the clamp ring that there is an undesired increase in the size of the seal face.

This shortcoming is taken care of by the invention inasfar as each projection has a heel. This heel may conform to a frusto-conical or cylindrical face. The seal ring engages the heel when it is deformed by the clamp ring radially to engage the heel so that, owing to such engagement, further radial motion of the seal ring is checked. In order to ensure that the parts, placed between the projections and deformed by the axial pressure of the seal ring, are also limited in their radial mobility, it is also possible to have heels on the surface of the backup ring between the projections. Although in accordance with the invention the radial mobility between the seal ring and the backup ring is limited or hindered by the heels in a desirable way, the overall radial mobility of the sleeve containing the seal ring still makes possible adaptation of the seal ring to the static or dynamic eccentricity of the rotating machine parts.

If owing to high contact forces of the seal ring on the rotating machine element and at the same time to a high relative sliding speed there are high frictional power losses, there is then a need to limit the heating of the fluid to be sealed off in the direct vicinity of the seal face by adopting special measures. In accordance with the invention this is made possible inasfar as the liquid flow caused by the peripheral undulation of the seal arrangement of the invention is enhanced by a forced exchange of the volume of liquid surrounding the entire seal. An additional cooling of the heat producing sliding seal faces is produced in a particularly convenient manner by arranging a pump ring to the side of the seal ring, said pump ring being stationary in relation to the seal ring. A narrow gap is formed between a peripheral face of the rotating machine element and the surface of the pump ring adjacent to this gap has a number of grooves that are at an oblique angle to the shaft axis. Owing to the rotary motion, the amount of fluid entrained by the rotating machine part is swept along by the side walls of the oblique grooves so that an axially directed cooling liquid flow is produced. Preferably this cooling fluid current is returned by a number of grooves in the opposite peripheral face of the pump ring.

On assembly and fitting of the different parts of the seal system, in accordance with the invention, into the machine there is a risk that critical functional parts, as for example an assymetrically formed backup ring, may be fitted the wrong way round. A further risk is that the sensitive sealing edge of the seal ring may be damaged. In accordance with the present invention this difficulty is countered by inserting the entire seal system consisting of the seal ring, the clamp ring, the backup ring and any pump ring employed in a sleeve in the factory producing the seal system so that a readily fitted subassembly results. The fitting of the subassembly by the ultimate user is then extremely simple, since all that is required is for it to be placed bodily in a hole in the machine requiring the seal.

If fluids have to be transmitted via a number of separate ducts in a machine from a stationary housing to the rotating machine part, so-called multiple rotary feed throughs are used. In this case there is a need to seal off axially juxtaposed annular chambers from each other. Since owing to the multiple seal arrangement and the correspondingly large overall drive power it is mandatory that the frictional losses at the separate seals be as low as possible, the employment of the seal system in accordance with the invention is particularly convenient in this regard. In this connection there is then the particular need to provide each separate groove receiving one of the seals with projections, in accordance with the invention, in at least one of its side walls.

This purpose is effected in a way that is particularly advantageous from the point of view of manufacturing technology if the seal grooves are formed by separate axially contiguous rings, the ring faces forming a non-pressure side wall of a groove having projections in accordance with the invention.

Sealing systems of the type in accordance with the present invention will however also be used if the fluids to be sealed are at different pressure differences at different times. If now, for example, the fluid to be sealed off is at a very low pressure difference after the first installation of the seal, it may be that the force then acting on the seal ring is not yet sufficient to effect a undulating deformation of the seal ring favoring lubrication and preventing rotational entrainment of the seal ring. In such a case projections in accordance with the invention are provided at the two side walls, contiguous to the seal ring, of the housing of the space surrounding the seal, the arrangement being such that the projections, that are each offset by half the pitch in the peripheral direction in relation to each other, on the opposite side walls cause undulating deformation of the seal ring even in the pressureless condition. This is achieved in connection with the centers, offset peripherally in relation to each other, of the projections inasfar as the front faces, facing the seal ring, of the projections have an axial spacing that is less than the axial breadth of the seal ring.

Further advantages and details of the invention will be seen from the following account of it referring to the accompanying drawings.

LIST OF SEVERAL VIEWS OF THE DRAWINGS

FIGS. 1, 1a to 1c show the elements of a first form of arrangement with an elastomer seal ring and a backup ring.

FIGS. 5 and 6 show further possible forms of the shaft seal of the present invention.

FIG. 9 shows a further arrangement with a seal ring, a clamping ring and a backup ring with projections.

FIG. 10 is a perspective view of a pump ring.

FIG. 11 shows a sealing arrangement including a seal ring, a clamp ring and a backup ring with projections.

FIG. 12 is a perspective view of the support ring of the arrangement of FIG. 11 with the projections of the invention.

FIGS. 14b and 14c show orthogonal projections of a section of the seal of FIG. 14a.

DETAILED ACCOUNT OF WORKING EXAMPLES OF THE INVENTION

Figure 1A:
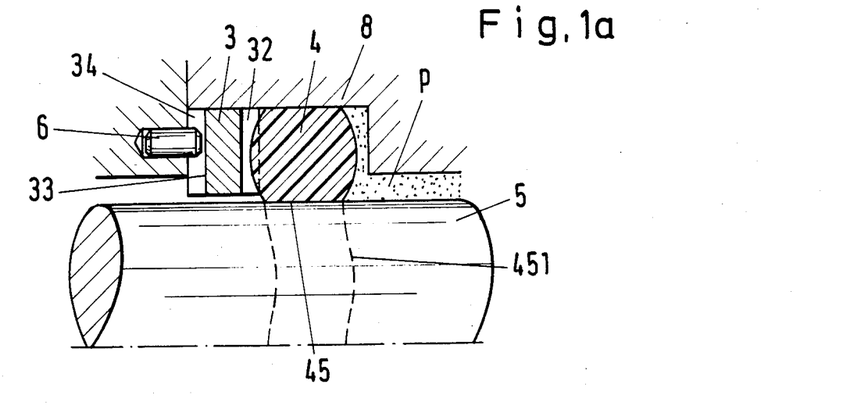
Figure 1B:
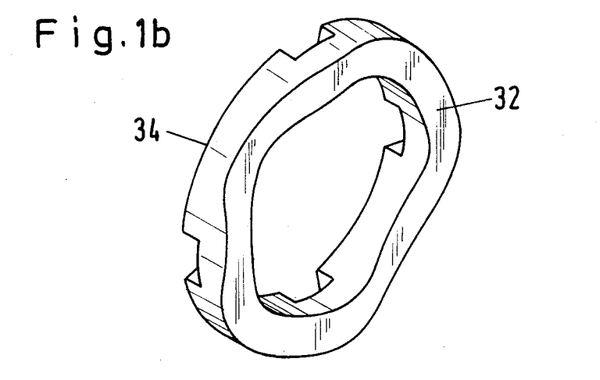
Figure 1C:
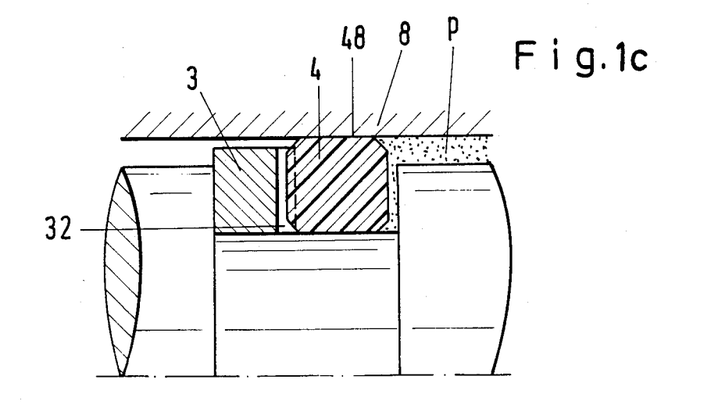

The FIGS. 1a to 1c show the elements of an arrangement with an elastomer seal ring 4 and a backup ring 3. FIG. 1a more especially indicates the arrangement as an undulating seal in longitudinal section, the seal ring and the backup ring being fitted in a radial groove in the cylindrical outer part 8. Together with the surface of the shaft the seal ring defines the sliding seal face 45. Under the action of the pressure p of the liquid to be sealed off, the seal ring first makes contact with the projections 32 of the backup ring 3. On an increase in pressure the parts of the seal ring between the projections bend or sag in an axial direction. In consequence the seal ring including the pressure edge 451 assumes an undulating form. On the radial face 33, remote from the seal ring, of the backup ring projections 34 are provided. Pins 6 are provided fitting inbetween them to prevent relative twisting of the outer part and the backup ring. The prevention of twisting between the seal ring and backup ring occurs automatically inasfar as, owing to the interlocking, caused by the deformation, of the seal ring and of the backup ring a positive fit with a locking action is produced. FIG. 1b is a perspective view of a backup ring in accordance with the invention, in which for example the projections 32 on the pressure side are made with an undulating form and the projections 34 have a prismatic one. FIG. 1c shows an arrangement, wherein the sealing ring 4 and the backup ring 3 are positioned in a groove in the shaft, the sliding seal face 48 being constituted by the peripheral face of the cylindrical outer part 8.

Figure 2A:
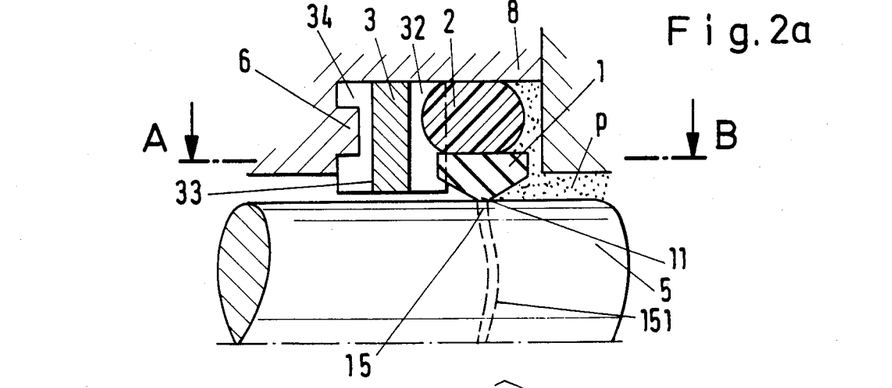
FIGS. 2a to 2c show the elements of an arrangement with a seal ring made of synthetic resin.
Figure 2B:
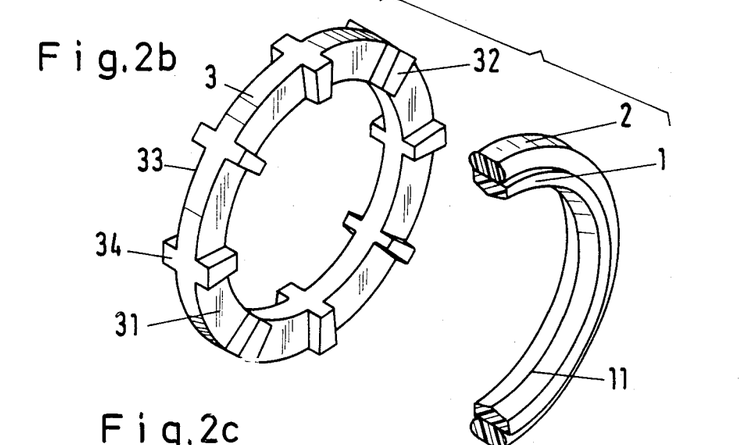
Figure 2C:
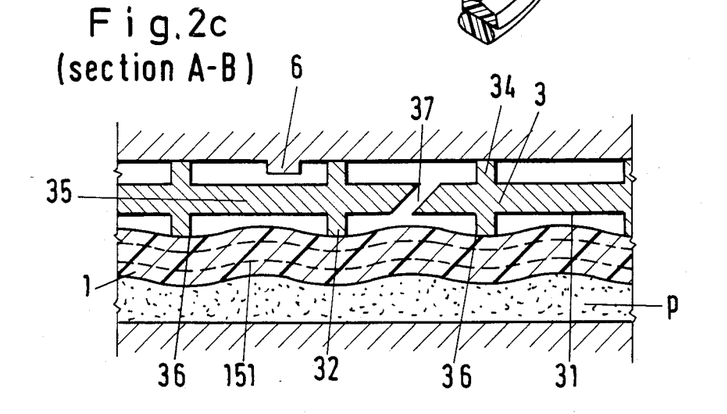

FIGS. 2a through 2c illustrate the elements of an arrangement with a seal ring 1 of synthetic resin, an elastomer ring 2 as a clamp ring and to provide a static seal in the housing, and a backup ring 3. FIG. 2a shows the arrangement in the form of a shaft seal in lengthways section, the seal ring, the clamp ring and the backup ring being fitted in a radial groove in the cylindrical outer part 8. The seal edge 11 of the seal ring 1 forms the sliding seal face 15 together with the surface of the shaft 5. Under the action of the pressure p of the liquid acting on the seal, the seal ring firstly comes into contact with the projections 32 of the backup ring 3. At the same time furthermore the clamp ring 2 engages the projections 32. On an increase in the pressure the parts, positioned between the projections 32, of the seal ring and of the clamp ring are bent parallel to the axis of rotation of the shaft. Accordingly the seal ring including its edge 151 on the pressure side of its sliding seal face assumes an undulating form. On the radial face 33, remote from the seal ring, of the backup ring projections 34 are present with projections 6 fitting between them to prevent relative twisting of the outer part and of the backup ring. The prevention of relative twisting between the seal ring and the backup ring is caused automatically inasfar as the deformation-dependent interlocking of the seal ring and of the backup ring gives rise to a positive joint or connection. FIG. 2b shows in perspective a backup ring in accordance with the invention, in the case of which the projections 32 on the pressure side are made prismatic with radially directed longitudinal edges. The opposite projections 34 are for example made similar to the projections 32 so that in this case the backup ring is made bilaterally symmetrical with a plane of symmetry normal to the axis of the shaft. The seal ring 1 with its seal edge 11 is clamped by an o-ring 2 with a secondary sealing effect. On similar lines to the construction in FIG. 1c it is naturally also possible for the combination of the seal ring, the clamp ring and the backup ring to be such that all three rings are placed jointly in a radial groove in the shaft, the seal edge, then placed on the outside, of the seal ring, making sealing engagement with a peripheral face of the cylindrical outer part 8. FIG. 2c serves to show a portion of a developed view of the seal arrangement as in FIGS. 2a and 2b. In this case the deformation-related anchoring of the bent seal ring 1 on the edges 36 of the prismatic projections 32 will be clearly seen. In this case as well it will be readily seen from this view that the plain part 35 of the backup ring 3 begins to bend as soon as the seal ring 1 (bent at a given pressure p) engages the parts of the face 31 situated between the projections 32.

Figure 3:
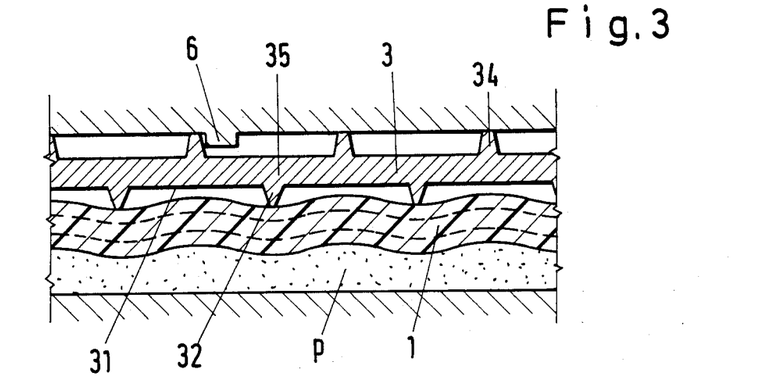
FIG. 3 shows a part of a developed view of the seal arrangement in accordance with the invention.

FIG. 3 shows a part of a developed view of the seal arrangement in accordance with the invention with the seal ring 1 and the backup ring 3. The seal ring engages the prismatic projections 32 of the backup ring while the latter engages the prismatic projections 34 on a wall, same bearing projections 6 to prevent twisting. In this working example of the invention the projections 32 and 34 are respectively offset in relation to each other by half a pitch so that in this case the bending of the seal ring does not increase any further when it contacts the surface 32 of the backup ring, whereas however the flexure between the projections 32 increases less sharply on an increase in pressure, since the part 35 of the plain part of the ring between the projections 34 is pliant.

Figure 4A:
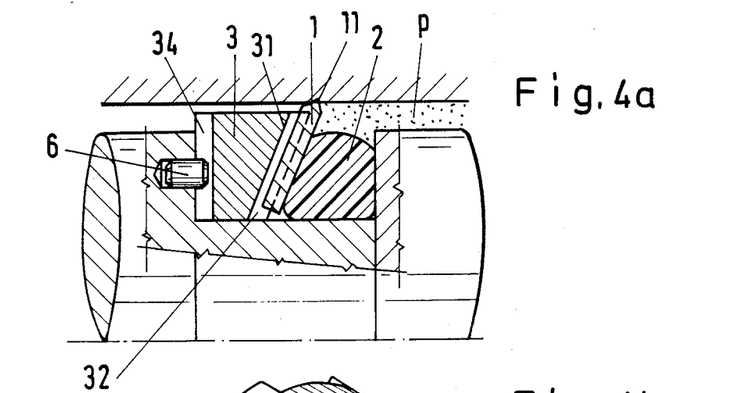
FIGS. 4a and 4b show the elements of an arrangement of a shaft seal in accordance with the invention.
Figure 4B:
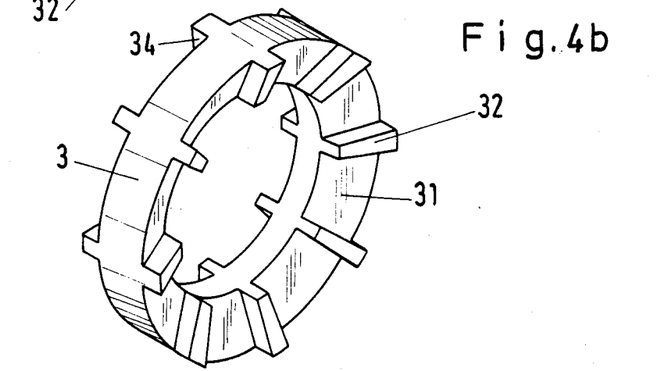

FIGS. 4a and 4b show the elements of an arrangement of the shaft seal incorporating the invention with a seal ring 1 in the form of a conical belleville washer 1 with the seal edge 11, a clamp ring 2 as an o-ring of elastomer and a backup ring 3 with projections 32 running out from its conical radial face 31. On its non-pressurized radial face the backup ring has projections 34 with the pins 6 fitting between them. FIG. 4b shows the conical backup ring of the arrangement of FIG. 4a in perspective.

The FIGS. 5 and 6 show further designs of the shaft seal in accordance with the invention, in each case with the seal rings 1, the clamp rings 2, the backup rings 3 bearing projections 32 and 34, and with the pins 6 fitting inbetween the projections 34 in order to prevent relative rotation.

Figure 7A:
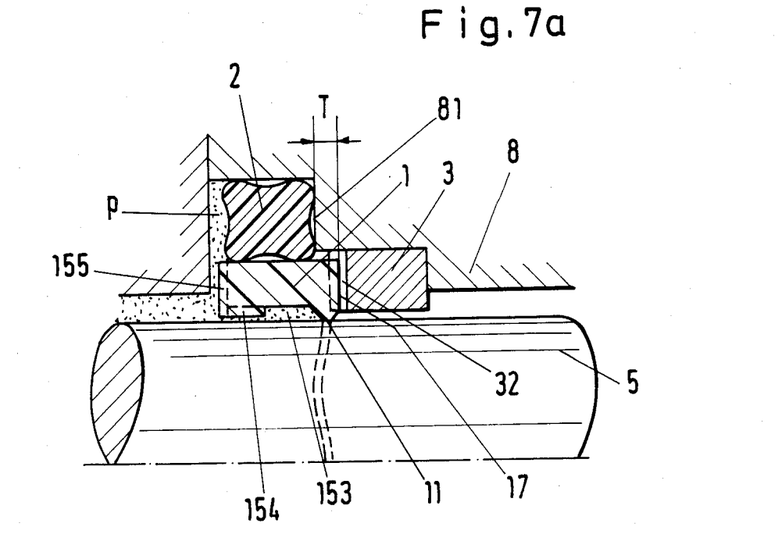
FIGS. 7a and 7b show a form of the shaft seal in accordance with the invention that has been optimized with respect to friction and lubrication.

FIG. 7a shows a form of the shaft seal that has been optimized as regards friction and lubrication. The seal ring 1 of resin has a seal edge 11 placed as near as possible to its radial face 17 remote from the pressure p. The clamp ring 2 is an x-ring of elastomer. The backup ring 3 with its projections 32 on its radial face is locked to the housing to prevent relative rotation and is so placed axially that the radial face 81 of the groove in the housing, engaged by the clamp ring at its non-pressurized radial face, is offset in relation to the non-pressurized radial face 33 of the seal ring by an amount "T" in an axial direction By choosing a suitable value of "T" it is possible to set the radial force to be transmitted from the clamp ring to the seal ring such that it is just sufficient for efficient sealing, this therefore ensuring the lowest possible frictional force between the seal ring and the revolving shaft.

The annular space 153 between the seal ring and the shaft 5 is connected with the space to be sealed off by means of at least one axial groove 154 in the seal ring and it is therefore always at the pressure p so that the seal ring is radially relieved of force. Furthermore on the pressurized radial face of the seal ring there is a radial groove 155 in order to allow the pressure p to take effect in the groove cavity upstream from the clamp ring. This ensures that the clamp ring is always loaded with the full pressure p even if there is a rapid change in the pressure.

Figure 7B:
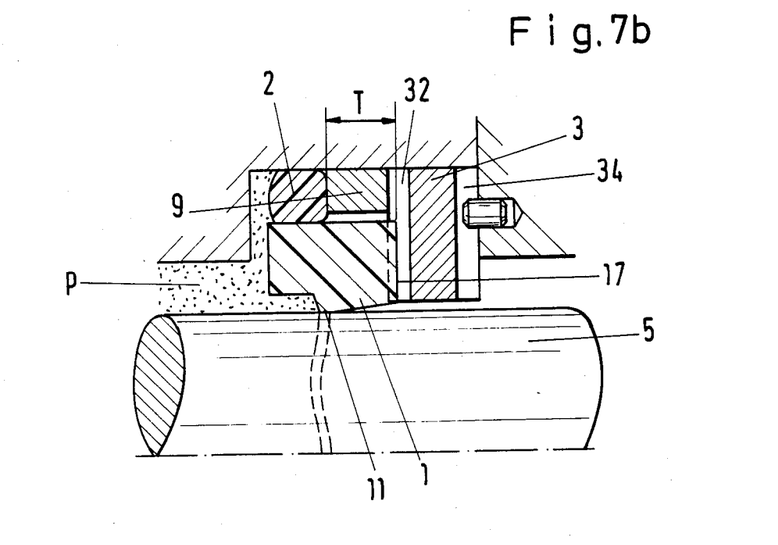

FIG. 7b shows a further design of a shaft seal in accordance with the invention in which in addition to the production of a pressure-related undulation of the sliding seal face the principle of partial relief of the seal edge 11 from the effect of the pressure of the fluid under pressure is employed. The two effects together yield an optimum sealing property with minimum friction and accordingly practically no wear. FIG. 7b shows how a PTFE edged seal packing or ring 1 as normally utilized for hydraulic seals may be used to seal against a revolving shaft so that there is practically no leakage and minimum friction, this being accomplished by having the seal ring resting axially on the projections of 32 of a backup ring 3. The additional spacer ring 9 here produces a supporting effect, offset axially by the amount "T", on the back side of the clamp ring, which in this case is in the form of an o-ring by way of example. Between the seal ring and the spacer ring there is so much radial play that it is not possible for any radial force to be transmitted from the spacer ring to the seal ring. Owing to this and furthermore owing to the choice of the amount "T", a designer will be able to so select the radial contact pressure, which increases with the fluid pressure, of the seal edge 11 so that on the one hand leakage and on the other hand frictional power loss at the seal may be matched to each other to be in accord with the specific purpose.

Figure 8:
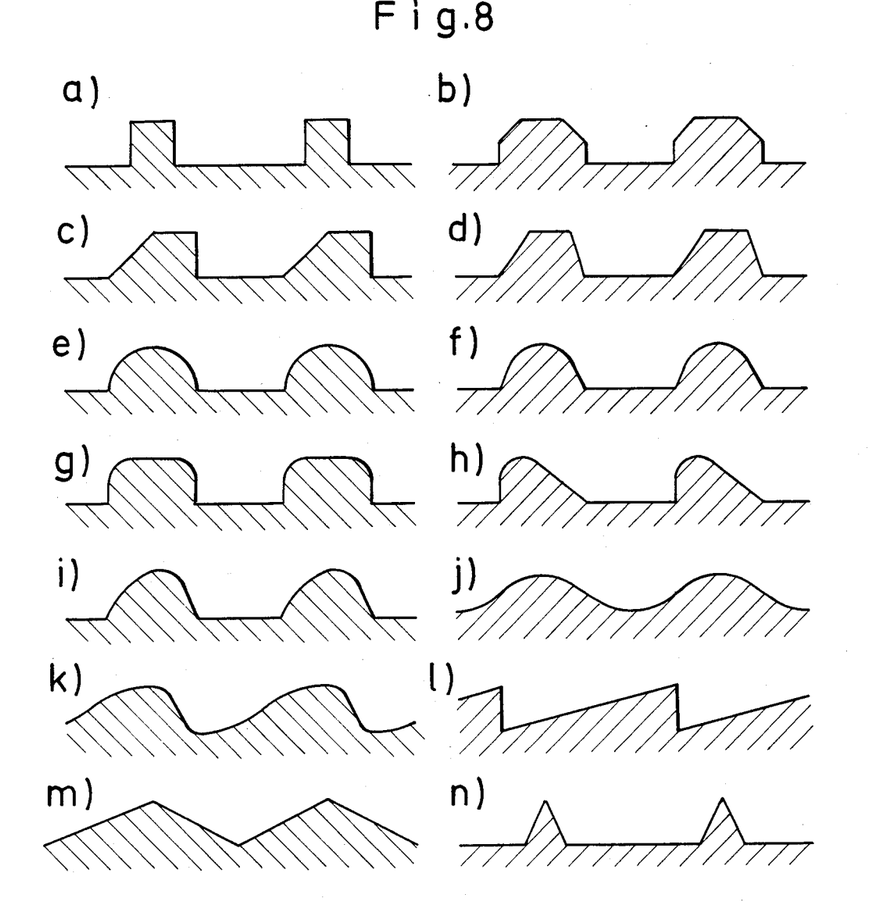
FIGS. 8a to 8n shows a series of different possible forms of the projections as used for axially supporting the seal ring in the invention.

FIGS. 8a through 8n show a series of possible forms of the projections that in the invention may be used for axially supporting the seal ring. The projections may be provided on the backup ring or on the seal ring.

An account will now be given of further measures of the invention using further working examples.

FIG. 9 shows an arrangement with the seal ring 1, the clamp ring 2, the backup ring 3 with its heels 321 and 322. These parts are fitted within the sleeve 81, the pump ring 83, which is located on the pressure side of the seal ring, having grooves 831, which are oblique in relation to the axis, and return grooves 832.

The pump ring is secured by crimping the edge 811. There is an elastomer seal 82 between the sleeve and the housing 8. The sleeve 81 axially engages separate elastic projections 84 on the housing, pins 85, that fit in between the projections 84, preventing relative twisting between the sleeve and the housing.

FIG. 10 is a perspective view of the pump ring 83 with its oblique grooves 831 and its axially placed return grooves 832.

FIG. 11 shows a seal arrangement with the seal ring 1, the clamp ring 2, the backup ring 3 and its heels 321 as fitted in the sleeve 81 and secured in place on the high pressure side by the disk 86 and the circlip 86. The sleeve 81 is held axially and also radially in the housing 89 by resting against the elastomer seal ring 82. The seal 82 at the same time serves to produce a sealing effect between the sleeve and the housing. A pin 85 fits radially into recesses 84 in the sleeve 81 and thereby prevents any relative rotation between the sleeve and the housing.

Figure 13:
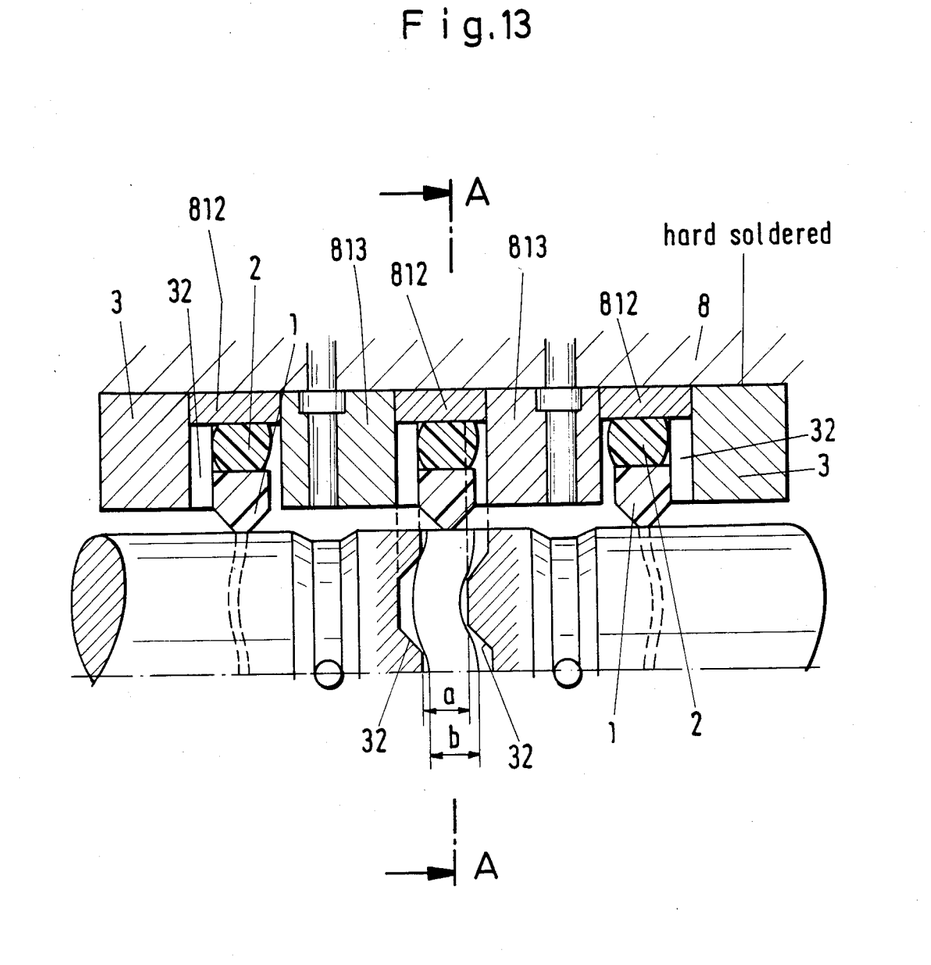
FIG. 13 shows the arrangement of a rotary feed through with in all three sealing systems in accordance with the invention.

FIG. 12 is a perspective view of the backup ring of the arrangement of FIG. 11 with the projections 32 in accordance with the invention and the heels 312, engaging both the projections and also the walls 32 of the backup ring between the projections, FIG. 13 shows the arrangement of a rotary feed through with three sealing systems in all in keeping with the invention. The system is made up of separate annular bodies, all of them being brazed to the housing 8. The groove accommodating the seal ring 1 and the clamp ring 2 is formed between the backup ring 3, the outer ring 812 and the ring 813. This rotary feed through system system is bilaterally symmetrical about the plane A—A. In it the projections 32 of the two backup rings 813 are offset circumferentially through one half of the pitch of the projections 32. At the same time at the middle seal groove the distance a of the projections is smaller than the axial breadth b of the seal 1 so that there will be an undulating deformation of the seal circumference even in the assembled but so far pressureless condition.

Figure 14A:
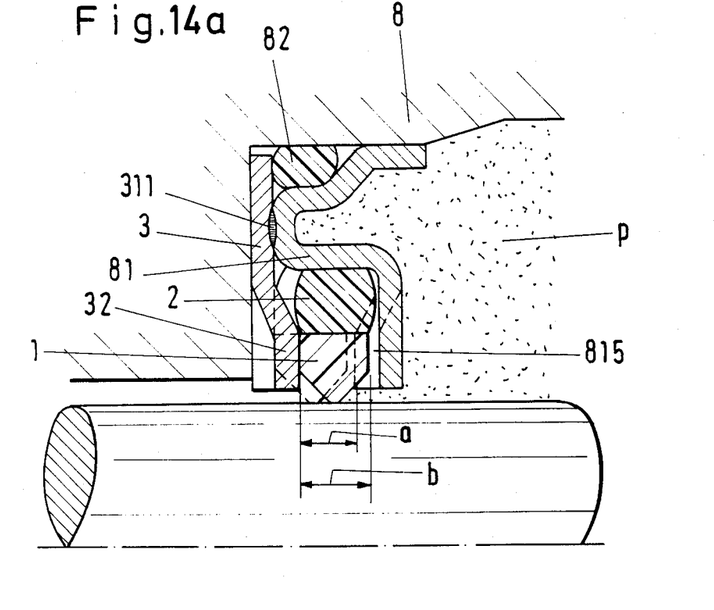
FIG. 14a shows in a sectional view a possible form of the novel shaft seal with a seal ring, a clamping ring, and a support ring and a sleeve.
Figure 14B:
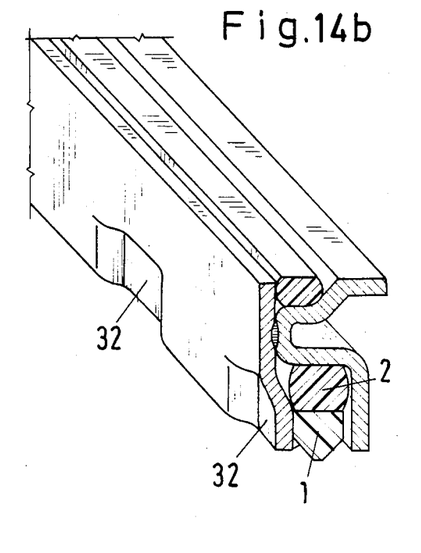
Figure 14C:
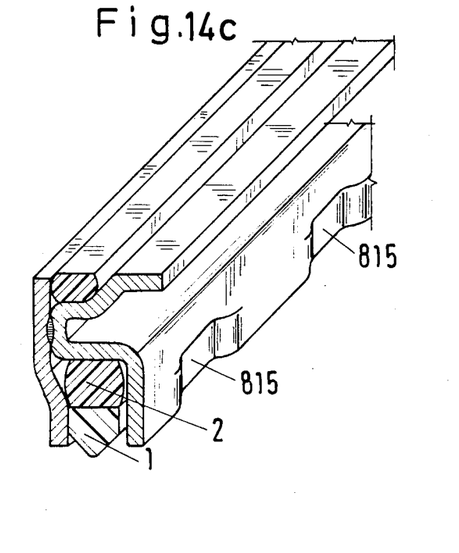

FIG. 14 lastly shows an embodiment of the shaft seal of the invention with a seal ring 1, a clamp ring 2, a backup ring 3 and a sleeve 81. This seal system is preferably made so that as regards fitting it is identical to radial shaft seals, the elastomer seal 82 providing a static seal between the sleeve and the housing 8. The sleeve and the backup ring are made of drawn metal sheet and welded together, preferably by spot welding at 311. The projections 32 on the backup ring and those 815 on the inner radial face of the sleeve are embossed when the sheet metal parts are produced. The projections 32 and 815 are in each case offset through half the pitch in the circumferential direction so that in each case the middle of a projection 815 of the sleeve comes between two projections 32. The axial spacing "a" between the projections 32 and 815 is smaller than the axial breadth "b" of the seal ring so that the seal ring will be given an undulating form, as seen in the circumferential direction, even on being fitted.

We claim:

1. A shaft seal for sealing off a pressure fluid present between a cylindrical shaft and a housing part surrounding the shaft, comprising an elastic seal ring arranged between said housing part and a circumferential sliding surface portion of said shaft, said seal ring defining a high pressure end face in contact with said pressure fluid and an opposite low pressure end face, a back-up ring mounted in said housing part opposite said low pressure end face, said back-up ring being provided with a plurality of axial projections, directed against said low pressure end face of the seal ring, whereby an axial thrust exerted by said pressure fluid against said seal ring is taken up by said projections thus producing an undulating deformation on said low pressure end face.

2. The shaft seal as claimed in claim 1 wherein each of said projections has a form of a prism with radially directed longitudinal edges.

3. The shaft seal as claimed in claim 1 wherein said projections are formed by the crests of undulations on said one end side of said back-up ring.

4. The shaft seal as claimed in claim 1, said seal ring is made of tough elastic synthetic material, said seal further comprising a rubber clamping ring clamping the seal ring radially and providing a static seal.

5. The shaft seal as claimed in claim 1, wherein said seal ring is made of tough elastic synthetic material, said seal further comprising a rubber clamping ring clamping the seal ring radially and providing a static seal, an initially sharp edge of said seal ring being in contact with the sliding surface, said edge being placed close to the low pressure end face of the seal ring.

6. The shaft seal as claimed in claim 1 comprising a sleeve in which said seal ring is placed, there being radial play between said sleeve and said housing part.

7. The shaft seal as claimed in claim 6 wherein said projections have heels thereon and wherein abutment faces placed between the projections have heels, wherein a cylindrical section of said seal ring turned towards said heels abuts the heels so that on the application of pressure radial sliding of the seal ring on the projections and the abutment faces cannot take place.

8. The shaft seal as claimed in claim 6 comprising a pump ring placed to the high pressure end face of the seal ring, said pump ring having grooves on a cylindrical face thereon facing said sliding surface, said grooves being oblique in relation to the axis of said shaft.

9. The shaft seal as claimed in claim 4 wherein said projections being part of said seal ring placed on a radial face thereof.

10. The shaft seal as claimed in claim 6 wherein said seal ring is mounted within a casing made up of at least two sheet metal components so that a part of one of the sheet metal components forms said backup ring and another sheet metal component forms a sleeve whereby opposite to said projections on said backup ring projections being embossed on a radial face of said sleeve, the opposite projections being offset in relation to each other circumferentially and the surfaces of the projections facing the seal ring have a minimum axial spacing smaller than the axial breadth of the seal ring.

* * * * *